US012744172B2

(12) United States Patent
Nikolic et al.

(10) Patent No.: US 12,744,172 B2
(45) Date of Patent: Sep. 22, 2026

(54) VACUUM SWITCHING UNIT AND VACUUM CIRCUIT BREAKER

(71) Applicant: Siemens Energy Global GmbH & Co. KG, Munich (DE)

(72) Inventors: Paul Gregor Nikolic, Erlangen (DE); Katrin Benkert, Schwaig (DE); Tobias Alexander Goebels, Issum (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 288 days.

(21) Appl. No.: 18/291,388

(22) PCT Filed: Jun. 28, 2022

(86) PCT No.: PCT/EP2022/067708
§ 371 (c)(1),
(2) Date: Jan. 23, 2024

(87) PCT Pub. No.: WO2023/001502
PCT Pub. Date: Jan. 26, 2023

(65) Prior Publication Data
US 2024/0371584 A1 Nov. 7, 2024

(30) Foreign Application Priority Data
Jul. 23, 2021 (DE) ..................... 10 2021 207 964.4

(51) Int. Cl.
*H01H 33/66* (2006.01)

(52) U.S. Cl.
CPC ............................... *H01H 33/6606* (2013.01)

(58) Field of Classification Search
CPC .... H02H 3/033; H01H 33/59; H01H 33/6606; H01H 33/66261; H01H 33/161; H01H 2033/146; H01H 2033/66284; H01H 2033/66292
USPC ....... 218/118, 134, 136, 138, 139, 143, 144, 218/145
See application file for complete search history.

(56) References Cited

U.S. PATENT DOCUMENTS 2,613,345 A * 10/1952 Osterland .............. G01R 15/16
324/126
3,147,356 A 9/1964 Luehring
(Continued)

FOREIGN PATENT DOCUMENTS

CN 2342504 Y * 10/1999 ............... H02H 3/20
CN 112435889 A 3/2021
(Continued)

OTHER PUBLICATIONS

Translation of CN2342504Y (Original document published Oct. 6, 1999) (Year: 1999).*
(Continued)

*Primary Examiner* — William A Bolton
(74) *Attorney, Agent, or Firm* — Laurence A. Greenberg; Werner H. Stemer; Ralph E. Locher

(57) ABSTRACT

A vacuum switching unit of a vacuum circuit breaker has a vacuum interrupter, an insulating sleeve which surrounds the vacuum interrupter, extends tubularly about a longitudinal axis of the vacuum interrupter and is made of an insulating material. A plurality of capacitor electrodes are integrated into the insulating sleeve.

14 Claims, 5 Drawing Sheets

(56) References Cited

U.S. PATENT DOCUMENTS

| | | | | |
|---|---|---|---|---|
| 3,355,564 | A * | 11/1967 | Ranheim .......... | H01H 33/66207 174/50.57 |
| 4,434,332 | A * | 2/1984 | Yanabu ................ | H01H 33/143 218/144 |
| 5,039,831 | A * | 8/1991 | Sato ..................... | H02B 13/035 218/144 |
| 5,266,758 | A * | 11/1993 | Pham ..................... | H01H 33/16 218/144 |
| 5,668,360 | A * | 9/1997 | Perret .................... | H01H 33/14 218/7 |
| 7,078,643 | B2 * | 7/2006 | Rostron ............... | H01H 33/166 218/144 |
| 7,239,492 | B2 | 7/2007 | Heimbach et al. | |
| 9,543,086 | B2 * | 1/2017 | Ermel ...................... | H01H 9/36 |
| 10,685,797 | B2 * | 6/2020 | Hartmann ........ | H01H 33/66261 |
| 11,456,133 | B2 | 9/2022 | Benkert et al. | |
| 2017/0287662 | A1 | 10/2017 | Ren et al. | |
| 2020/0161065 | A1 | 5/2020 | Djogo | |

FOREIGN PATENT DOCUMENTS

| | | | |
|---|---|---|---|
| JP | S4517483 | Y1 | 7/1970 |
| JP | S5151150 | U | 4/1976 |
| JP | S52142658 | U | 10/1977 |
| JP | S53111357 | U | 9/1978 |
| JP | S5970920 | U | 5/1984 |
| JP | S60181836 | U | 12/1985 |
| JP | 2001126596 | A | 5/2001 |
| JP | 2001312948 | A | 11/2001 |
| JP | 2017157453 | A | 9/2017 |
| JP | 2020136004 | A | 8/2020 |
| WO | WO 02097839 | A1 | 12/2002 |
| WO | WO 2020025407 | A1 | 2/2020 |

OTHER PUBLICATIONS

Translation of JP2017157453A (Original document published Sep. 7, 2017) (Year: 2017).*

* cited by examiner

VACUUM SWITCHING UNIT AND VACUUM CIRCUIT BREAKER

FIELD AND BACKGROUND OF THE INVENTION

The invention relates to a vacuum switching unit of a vacuum circuit breaker and to a vacuum circuit breaker.

Vacuum circuit breakers are power circuit breakers in which switching contact elements, which are movable relative to one another, are arranged in a vacuum switching tube (vacuum switching chamber). Vacuum circuit breakers are, in particular, low-maintenance, durable and easily drivable. To meet voltage requirements, a vacuum circuit breaker can have a plurality of vacuum switching tubes, the switching paths of which are electrically connected in series. In this case (when the switching paths of the vacuum switching tubes have been opened), the aim is to achieve a voltage divide across the vacuum switching tubes that is adapted to the vacuum switching tubes, in order to avoid overloading of individual vacuum switching tubes. By way of example, for a plurality of identically designed vacuum switching tubes connected in series, the aim is to achieve a voltage divide that is as uniform as possible across the vacuum switching tubes.

To achieve a desired voltage divide across the vacuum switching tubes, passive electrical components such as control capacitors and/or control resistors are connected in parallel with the vacuum switching tubes, for example. However, these components increase the installation space required for a vacuum circuit breaker. In particular in the case of a vacuum circuit breaker with purified and dehumidified compressed air as an insulating medium surrounding the vacuum switching tubes, and conventional control capacitors, relatively large insulation distances are necessary between a vacuum switching tube and a control capacitor and also between a control capacitor and a metal circuit-breaker housing of the vacuum circuit breaker, because the compressed air has a relatively low dielectric strength (in comparison to other insulating gases such as sulfur hexafluoride).

SUMMARY OF THE INVENTION

The invention is based on the object of making it possible to control the voltage in a vacuum circuit breaker by means of control capacitors with low space requirements.

The object is achieved according to the invention by a vacuum switching unit as claimed and a vacuum circuit breaker as claimed.

Advantageous configurations of the invention are the subject matter of the dependent claims.

An inventive vacuum switching unit of a vacuum circuit breaker comprises a vacuum switching tube, an insulating sleeve that surrounds the vacuum switching tube, extends in a tubular manner around a longitudinal axis of the vacuum switching tube and is made of an insulating material, and a plurality of capacitor electrodes integrated into the insulating sleeve.

A vacuum switching unit according to the invention therefore has, instead of a conventional control capacitor or a plurality of such control capacitors, a multiplicity of capacitor electrodes which are integrated into an insulating sleeve that surrounds the vacuum switching tube. In other words, according to the invention, the capacitance of conventional control capacitors is divided across capacitor electrodes integrated into the insulating sleeve. As a result of this, the insulating distances of the capacitor electrodes from the vacuum switching tube and a metal circuit-breaker housing of the vacuum circuit breaker can be reduced in comparison to conventional control capacitors, which saves installation space in particular when the circuit-breaker housing is filled with purified and dehumidified compressed air as the insulating gas. The insulating sleeve also advantageously acts as a solids insulator that promotes the effect of the insulating gas.

In a configuration of the vacuum switching unit according to the invention, the capacitor electrodes each extend in an annular or partially annular manner around the longitudinal axis of the vacuum switching tube. This advantageously gives a uniform distribution of the capacitances of the capacitor electrodes around the vacuum switching tube.

In a further configuration of the vacuum switching unit according to the invention, electrode pairs of concentrically extending capacitor electrodes having mutually facing electrode surfaces are formed of capacitor electrodes and the electrode pairs of concentrically extending capacitor electrodes are axially at a distance from one another in relation to the longitudinal axis of the vacuum switching tube. For example, each electrode pair of concentrically extending capacitor electrodes is formed of a capacitor electrode that extends on a surface of the insulating sleeve that faces toward the vacuum switching tube, and a capacitor electrode that extends on a surface of the insulating sleeve that faces away from the vacuum switching tube. Here, the concentrically extending capacitor electrodes are formed, for example, of electrically conductive coating layers applied to the insulating sleeve.

In the above-mentioned configuration of the vacuum switching unit according to the invention, annular or partially annular capacitors, which have concentric electrode surfaces and are axially at a distance from one another, are formed of at least some of the capacitor electrodes. An arrangement of the capacitor electrodes on mutually opposed surfaces of the insulating sleeve advantageously simplifies the integration of the capacitor electrodes into the insulating sleeve, in particular if the capacitor electrodes are formed of electrically conductive coating layers.

In a further configuration of the vacuum switching unit according to the invention, capacitor electrodes extend inside the insulating sleeve axially at a distance from one another in relation to the longitudinal axis of the insulating sleeve and have mutually facing electrode surfaces. In this configuration of the vacuum switching unit according to the invention, capacitors with electrode surfaces axially at a distance from one another are formed of at least some of the capacitor electrodes.

In a further configuration of the vacuum switching unit according to the invention, electrode pairs of capacitor electrodes with mutually facing electrode surfaces form capacitors that are connected in series by electrical wires integrated into the insulating sleeve. In this configuration of the vacuum switching unit according to the invention, therefore, in addition to the capacitor electrodes, electrical wires are integrated into the insulating sleeve, which electrical wires electrically connect, in series, capacitors formed of the capacitor electrodes. In an identical way, capacitors formed of capacitor electrodes can be connected in parallel with one another by electrical wires that are integrated into the insulating sleeve, in particular if the capacitor electrodes of these capacitors are designed in a partially annular manner.

In a further configuration of the vacuum switching unit according to the invention, at least one electrical resistor is integrated into the insulating sleeve and is connected, by electrical wires integrated into the insulating sleeve, in series or in parallel with at least one capacitor formed of two capacitor electrodes. In this configuration of the vacuum switching unit according to the invention, therefore, in addition to the capacitor electrodes, at least one electrical resistor is integrated into the insulating sleeve and is connected in series or in parallel with at least one of these capacitors.

In a further configuration of the vacuum switching unit according to the invention, the vacuum switching tube has at least one shield electrode that is electrically conductively connected and/or capacitively electrically coupled to a capacitor electrode. This configuration of the vacuum switching unit according to the invention therefore provides a direct and/or capacitive coupling of capacitor electrodes, which are integrated into the insulating sleeve, to electrical potentials of shield electrodes of the vacuum switching tube.

In a further configuration of the vacuum switching unit according to the invention, the insulating sleeve is made from a thermoplastic such as polyoxymethylene (POM), polyethylene terephthalate (PETP), polyvinylidene fluoride (PVDF) or polyamide (PA6.6) or from epoxy resin that has a permittivity-increasing filler, such as barium titanate ($BaTiO_3$). In this configuration of the vacuum switching unit according to the invention, the insulating sleeve is made by a conventional method, for example by injection molding. This configuration is preferred in the case of a simple integration of the capacitor electrodes into the insulating sleeve, for example on the surfaces thereof.

In an alternative configuration to the above-mentioned configuration of the vacuum switching unit according to the invention, the insulating sleeve, together with the capacitor electrodes, is made by 3D printing. For example, the insulating sleeve is printed from a polylactide (PLA), acrylonitrile butadiene styrene copolymer (ABS), PVDF or chlorinated polyethylene (CPE) and the capacitor electrodes are printed from an electrically conductive filament. In this configuration of the vacuum switching unit according to the invention, the insulating sleeve and the capacitor electrodes are made together by 3D printing. In the case of geometrically complex embodiments of the insulating sleeve and/or capacitor electrodes, this configuration is preferred, in particular in the case of capacitor electrodes embedded into the insulating sleeve.

In a further configuration of the vacuum switching unit according to the invention, at least one region of a surface of the vacuum switching tube that faces toward the insulating sleeve and/or at least one region of a surface of the insulating sleeve that faces toward the vacuum switching tube have a coating that homogenizes an electrical field between the insulating sleeve and the vacuum switching tube. For example, such a coating is made from a semiconductive material. This configuration of the vacuum switching unit according to the invention makes it possible to avoid or at least reduce partial discharges between the insulating sleeve and the vacuum switching tube.

In a further configuration of the vacuum switching unit according to the invention, the insulating sleeve is composed of at least two sleeve parts. This configuration of the vacuum switching unit according to the invention is advantageous if the outer diameter of the vacuum switching tube varies along the longitudinal axis thereof. Putting the insulating sleeve together from a plurality of sleeve parts then makes it possible to assemble an insulating sleeve having a geometry that matches the shape of the vacuum switching tube.

A vacuum circuit breaker according to the invention has at least one vacuum switching unit according to the invention. In particular, the vacuum circuit breaker can have a plurality of vacuum switching units according to the invention, the switching paths of which are electrically connected in series. As has already been explained above, in the case of vacuum circuit breakers with a plurality of vacuum switching tubes, the switching paths of which are electrically connected in series, dividing of the voltage across the vacuum switching tubes, which avoids overloading of individual vacuum switching tubes, is important. Vacuum switching units according to the invention are therefore suitable, in particular, for such vacuum circuit breakers with a plurality of vacuum switching tubes.

The above-described properties, features and advantages of this invention, and also the manner in which these are achieved, will become clearer and easier to understand in conjunction with the following description of exemplary embodiments, which will be explained in more detail in conjunction with the drawings. In the drawings:

BRIEF DESCRIPTION OF THE FIGURES

Corresponding parts are provided with the same reference signs in the figures.

DETAILED DESCRIPTION OF THE INVENTION

Figure 1:
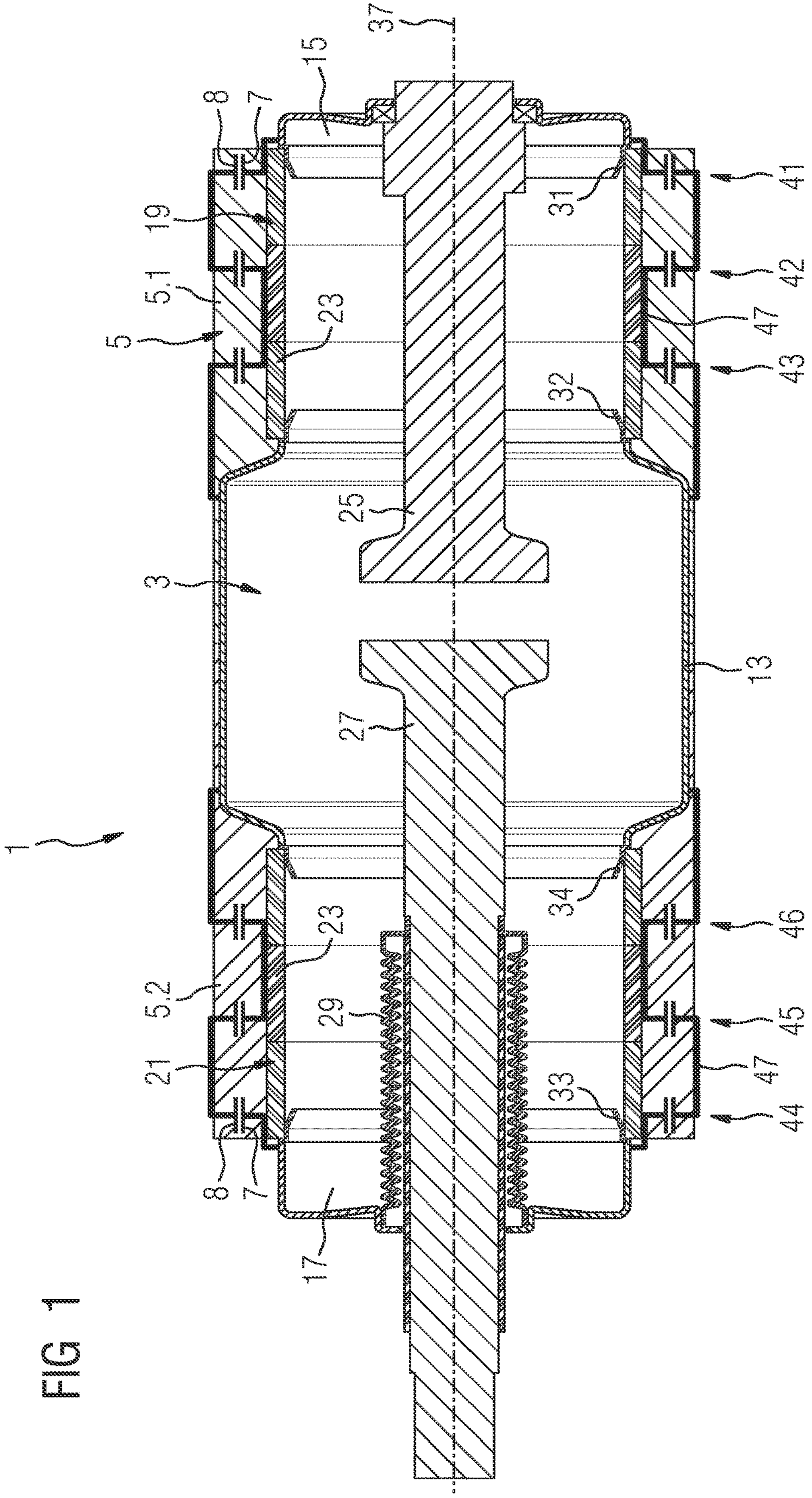
FIG. 1 shows a sectional representation of a first exemplary embodiment of a vacuum switching unit.

FIG. 1 (FIG. 1) shows a sectional representation of a first exemplary embodiment of an inventive vacuum switching unit 1 of a vacuum circuit breaker. The vacuum switching unit 1 comprises a vacuum switching tube 3, an insulating sleeve 5 that surrounds the vacuum switching tube 3, and a plurality of capacitor electrodes 7, 8 integrated into the insulating sleeve 5.

The vacuum switching tube 3 has a switching tube housing that is formed of a metal center region 13, two metal end regions 15, 17 and two insulating regions 19, 21. The center region 13 has a larger diameter than the end regions 15, 17 and the insulating regions 19, 21 and is arranged between the insulating regions 19, 21. The insulating regions 19, 21 are each made from an electrically non-conductive material, for example from a ceramic material. In the exemplary embodiment shown, each insulating region 19, 21 is composed of three annular insulating segments 23. The end regions 15, 17 form mutually opposed end faces of the switching tube housing.

Furthermore, the vacuum switching tube 3 has two electrically conductive switching contact elements 25, 27. Here, a first switching contact element 25 is fixedly connected to a first end region 15 of the switching tube housing and extends through a first insulating region 19 into the center region 13 of the switching tube housing. The second switching contact element 27 is movable relative to the first switching contact element 25, by means of a mechanism (not depicted), between a first switching position in which the switching contact elements 25, 27 touch one another and a second switching position, shown in FIG. 1, in which the switching contact elements 25, 27 are at a distance from one another. The second switching contact element 27 is guided out of the switching tube housing through an opening in the second end region 17 and protrudes through the second insulating region 21 into the center region 13 of the switching tube housing. One end of a metal bellow 29 is attached to the second switching contact element 27, and said metal bellow 29 is connected by its other end to the second end region 17 of the switching tube housing and, between its ends, surrounds the second switching contact element 27.

Furthermore, the vacuum switching tube 3 has a plurality of shield electrodes 31 to 34. A first shield electrode 31 is arranged at the first end region 15 of the switching tube housing, protrudes out of the first end region 15 into the interior of the switching tube housing and surrounds the first switching contact element 25 in an annular manner there. A second shield electrode 32 is arranged at an end of the center region 13 of the switching tube housing that faces toward the first end region 15 and surrounds the first switching contact element 25 in an annular manner there.

A third shield electrode 33 is arranged at the second end region 17 of the switching tube housing, protrudes out of the second end region 17 into the interior of the switching tube housing and surrounds the second switching contact element 27 and the bellow 29 in an annular manner there. A fourth shield electrode 34 is arranged at an end of the center region 13 of the switching tube housing that faces toward the second end region 17 and surrounds the second switching contact element 25 in an annular manner there.

The inner surface of the center region 13 of the switching tube housing and the shield electrodes 32, 34 form vapor shields in particular, which absorb material evaporating from the switching contact elements 25, 27 and prevent this material from being deposited on the inner walls of the insulating regions 19, 21 and impairing the electrically insulating action thereof.

The insulating sleeve 5 extends in a tubular manner around a longitudinal axis 37 of the vacuum switching tube 3. The insulating sleeve 5 is composed of two sleeve parts 5.1, 5.2. A first sleeve part 5.1 extends around the first insulating region 19 and a first part of the center region 13 of the switching tube housing. The second sleeve part 5.2 extends around the second insulating region 21 and a second part of the center region 13 of the switching tube housing. During production of the vacuum switching unit 1, the first sleeve part 5.1 is pushed out from the side of the first end region 15 over the switching tube housing and the second sleeve part 5.2 is pushed out from the side of the second end region 17 over the switching tube housing.

Each capacitor electrode 7, 8 extends inside the insulating sleeve 5, that is to say embedded into the insulating sleeve 5, in an annular manner around the longitudinal axis 37. Here, in this exemplary embodiment, six electrode pairs 41 to 46 of concentrically extending capacitor electrodes 7, 8 with mutually facing electrode surfaces are formed from the capacitor electrodes 7, 8, and therefore each electrode pair 41 to 46 has an inner capacitor electrode 7 and an outer capacitor electrode 8 that extends around the inner capacitor electrode 7. The electrode pairs 41 to 46 are axially at a distance from one another in relation to the longitudinal axis 37, wherein three electrode pairs 41 to 43 are arranged around the first insulating region 19 and three further electrode pairs 44 to 46 are arranged around the second insulating region 21.

The outer capacitor electrodes 8 of a first electrode pair 41 and of a second electrode pair 42 are electrically conductively connected to one another by electrical wires that are integrated into the insulating sleeve 5. In an identical way, the inner capacitor electrodes 7 of the second electrode pair 42 and of a third electrode pair 43 are electrically conductively connected to one another, and therefore the electrode pairs 41 to 43 form capacitors that are electrically connected in series. Furthermore, in an identical way to the exemplary embodiment shown in FIG. 3, electrical resistors 49 can be connected between these capacitors and/or in parallel with these capacitors, which electrical resistors 49 are integrated into the insulating sleeve 5.

Furthermore, the inner capacitor electrode 7 of the first electrode pair 41 is electrically conductively connected to the first end region 15 of the switching tube housing, and the outer capacitor electrode 8 of the third electrode pair 43 is electrically conductively connected to the center region 13 of the switching tube housing. Instead of electrically conductive connections, it is also possible to provide purely capacitive couplings of these capacitor electrodes 7, 8 to the electrical potentials of the first end region 15 and the center region 13 respectively.

Correspondingly, the outer capacitor electrodes 8 of a fourth electrode pair 44 and of a fifth electrode pair 45 and also the inner capacitor electrodes 7 of the fifth electrode pair 45 and of the sixth electrode pair 46 are electrically conductively connected to one another, and therefore the electrode pairs 44 to 46 also form capacitors that are electrically connected in series. Electrical resistors 49 can also be connected between these capacitors and/or in parallel with these capacitors, which electrical resistors 49 are integrated into the insulating sleeve 5.

Furthermore, the inner capacitor electrode 7 of the fourth electrode pair 44 is electrically conductively connected to the second end region 17 of the switching tube housing, and the outer capacitor electrode 8 of the sixth electrode pair 46 is electrically conductively connected to the center region 13 of the switching tube housing. Again, instead of electrically conductive connections, it is also possible to provide purely capacitive couplings of these capacitor electrodes 7, 8 to the electrical potentials of the second end region 17 and the center region 13 respectively.

The sleeve parts 5.1, 5.2 of the insulating sleeve 5 are produced together with the capacitor electrodes 7, 8, electrical wires 47 and optionally the electrical resistors 49 integrated into said sleeve parts 5.1, 5.2 in each case, for example by 3D printing. Here, the sleeve parts 5.1, 5.2 are printed from PLA, ABS, PVDF or CPE, for example, and the capacitor electrodes 7, 8, the electrical wires 47 and optionally the electrical resistors 49 are printed from an electrically conductive filament.

As a result of the interaction of the capacitor electrodes 7, 8, a control capacitance in the range from 10 pF to 500 pF, for example, is created.

Figure 2:
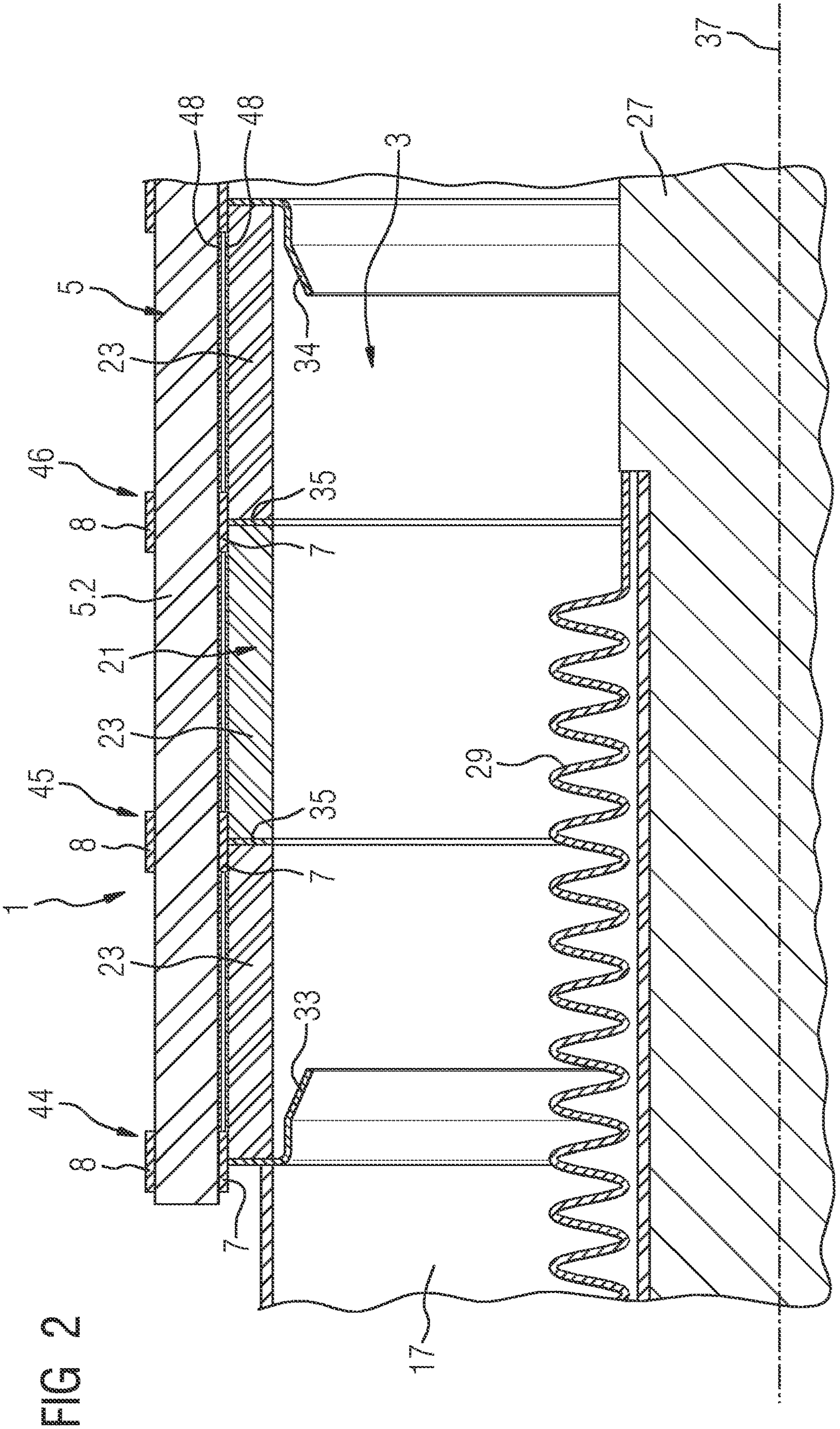
FIG. 2 shows a detail of a sectional representation of a second exemplary embodiment of a vacuum switching unit.

FIG. 2 (FIG. 2) shows a detail of a sectional representation of a second exemplary embodiment of a vacuum switching unit 1 according to the invention. The vacuum switching unit 1 again comprises a vacuum switching tube 3, an insulating sleeve 5 that surrounds the vacuum switching tube 3, and a plurality of capacitor electrodes 7, 8 integrated into the insulating sleeve 5. The exemplary embodiment of a vacuum switching unit 1 according to the invention, shown in FIG. 2, differs from the exemplary embodiment shown in FIG. 1 substantially only in the arrangement of the capacitor electrodes 7, 8 and the electrical coupling thereof to shield electrodes 31 to 35 of the vacuum switching tube 3, wherein the vacuum switching tube 3 has, in addition to the shield electrodes 31 to 34 of the exemplary embodiment shown in FIG. 1, further shield electrodes 35 that each extend in an annular manner between two adjacent insulating segments 23 of the insulating regions 19, 21 of the switching tube housing.

The capacitor electrodes 7, 8 again form electrode pairs 41 to 46, wherein the capacitor electrodes 7, 8 of each electrode pair 41 to 46 extend concentrically and have mutually facing electrode surfaces. In contrast to the exemplary embodiment shown in FIG. 1, however, the capacitor electrodes 7, 8 are not arranged inside the insulating sleeve 5, that is to say embedded into the insulating sleeve 5, rather the inner capacitor electrodes 7 extend in an annular manner around the longitudinal axis 37 on a surface of the insulating sleeve 5 that faces toward the vacuum switching tube 3 and the outer capacitor electrodes 8 extend in an annular manner around the longitudinal axis 37 on a surface of the insulating sleeve that faces away from the vacuum switching tube 3. Furthermore, in contrast to the exemplary embodiment shown in FIG. 1, no capacitor electrodes 7, 8 are connected to one another by electrical wires 47, and the inner capacitor electrodes 7 of the electrode pairs 42, 43, 45 and 46 are each electrically conductively connected to a shield electrode 35 that is arranged between two adjacent insulating segments 23.

Moreover, it can be envisioned that regions of the surface (that faces toward the vacuum switching tube 3) of the insulating sleeve 5 that are not covered by capacitor electrodes 7, and regions of the surface (that faces toward the insulating sleeve 5) of the vacuum switching tube 3 that lie opposite said regions, have coatings 48 with, for example, a semiconductive material, which coatings 48 homogenize an electrical field in the space between the insulating sleeve 5 and the vacuum switching tube 3. Such coatings 48 can also be provided in the exemplary embodiments that are shown in FIG. 1, 3 or 4.

The sleeve parts 5.1, 5.2 of the insulating sleeve 5 of the vacuum switching unit 1 shown in FIG. 2 are produced, for example, from a thermoplastic such as POM, PETP, PVDF or PA6.6 or from epoxy resin that has a permittivity-increasing filler such as barium titanate ($BaTiO_3$), using a conventional method such as injection molding. The capacitor electrodes 7, 8 are subsequently applied to the insulating sleeve 5, for example as metal electrodes or as electrically conductive coating layers.

Figure 3:
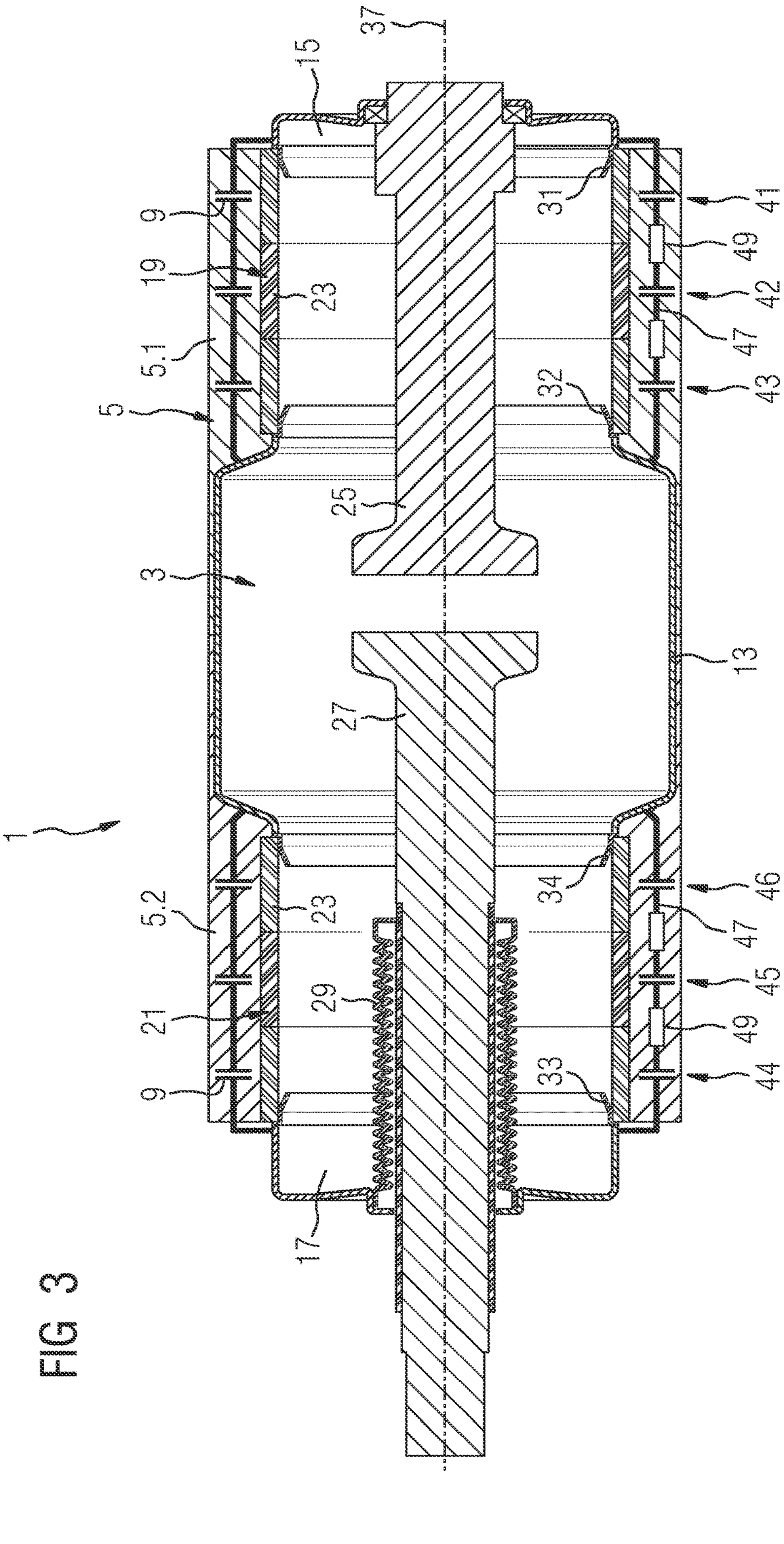
FIG. 3 shows a sectional representation of a third exemplary embodiment of a vacuum switching unit.
Figure 4:
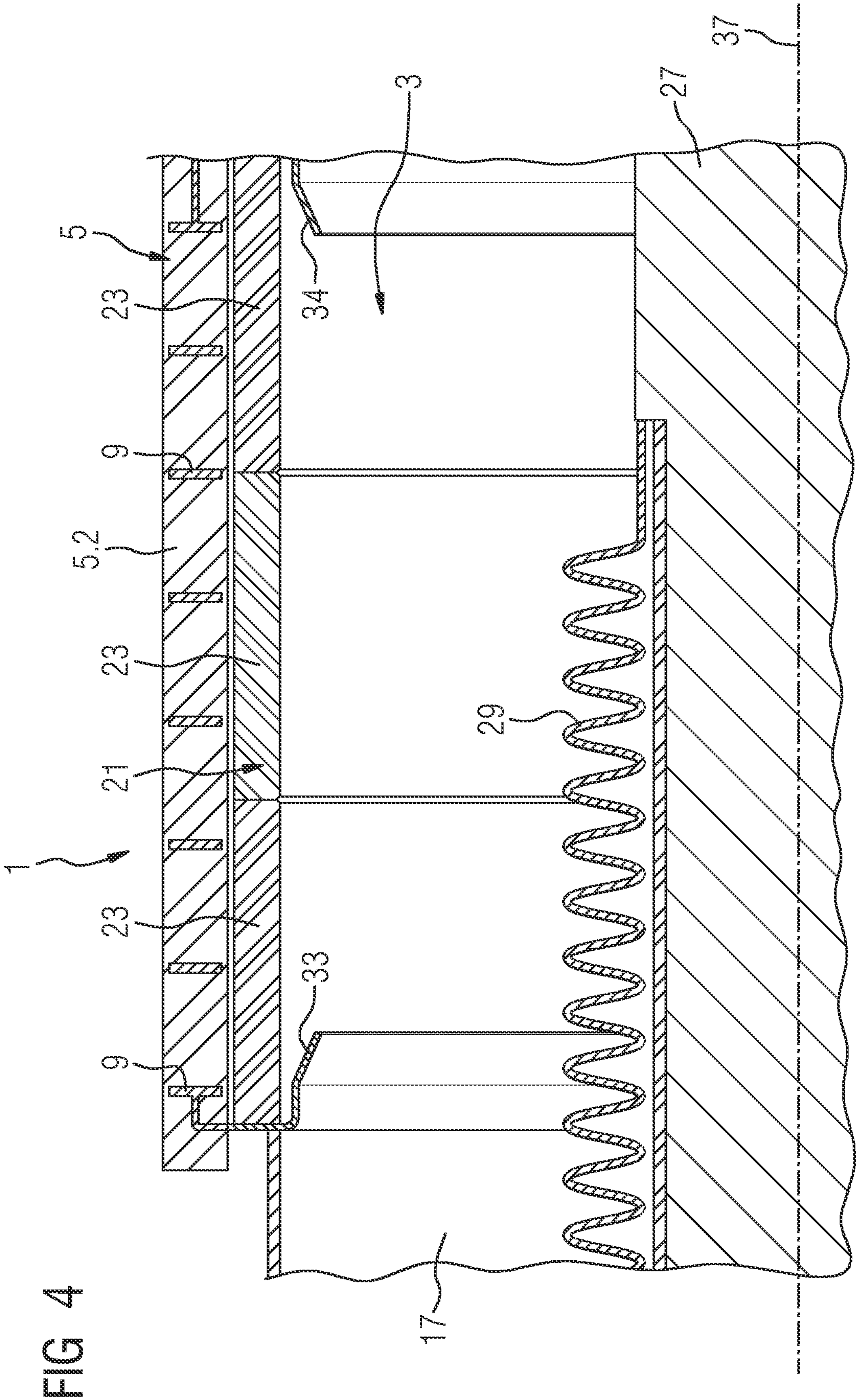
FIG. 4 shows a detail of a sectional representation of a fourth exemplary embodiment of a vacuum switching unit.

FIG. 3 (FIG. 3) shows a sectional representation of a third exemplary embodiment of a vacuum switching unit 1. The vacuum switching unit 1 comprises a vacuum switching tube 3, an insulating sleeve 5 that surrounds the vacuum switching tube 3, and a plurality of capacitor electrodes 9 integrated into the insulating sleeve 5. The vacuum switching tube 3 and the insulating sleeve 5 are designed as in the exemplary embodiment shown in FIG. 1, and will therefore not be described again here.

Each capacitor electrode 9 extends inside the insulating sleeve 5, that is to say embedded into the insulating sleeve 5, in an annular manner around the longitudinal axis 37. In each sleeve part 5.1, 5.2 of the insulating sleeve 5, six capacitor electrodes 9 are arranged axially at a distance from one another in relation to the longitudinal axis 37 and form three electrode pairs 41, 42, 43 and 44, 45, 46 respectively, which form capacitors that are electrically connected in series by electrical wires 47 integrated into the respective sleeve part 5.1, 5.2. Furthermore, electrical resistors 49 that are integrated into the insulating sleeve 5 can be connected between said capacitors and/or in parallel with said capacitors.

Furthermore, each end region 15, 17 of the switching tube housing is electrically conductively connected to the capacitor electrode 9 closest to it and each end of the center region 13 of the switching tube housing that faces toward an end region 15, 17 is electrically conductively connected to the capacitor electrode 9 closest to it. In an identical way to the exemplary embodiment shown in FIG. 1, the electrically conductive connections of the end regions 15, 17 and of the center region 13 of the switching tube housing to capacitor electrodes 9 can be dispensed with and will then be replaced by purely capacitive electrical couplings of said capacitor electrodes 9 to the electrical potentials of the end regions 15, 17 and the center region 13, respectively.

The exemplary embodiment of a vacuum switching unit 1 shown in FIG. 3 therefore differs from the exemplary embodiment shown in FIG. 1 substantially only in that the two capacitor electrodes 9 of each electrode pair 41 to 46 are not arranged concentrically, but axially at a distance from one another with axially mutually opposed electrode surfaces. As in the case of the exemplary embodiment shown in FIG. 1, the sleeve parts 5.1, 5.2 of the insulating sleeve 5 are produced together with the capacitor electrodes 9, electrical wires 47 and optionally the electrical resistors 49 integrated into said sleeve parts 5.1, 5.2 in each case, for example by 3D printing.

FIG. 4 (FIG. 4) shows a detail of a sectional representation of a fourth exemplary embodiment of a vacuum switching unit 1. This exemplary embodiment differs from the exemplary embodiment shown in FIG. 3 substantially only in the number and distances of the capacitor electrodes 9 integrated into the sleeve parts 5.1, 5.2 and also in that no capacitor electrodes 9 are electrically conductively connected to one another by electrical wires 47 integrated into the insulating sleeve 5. The electrical coupling of the capacitor electrodes 9 therefore takes place only purely capacitively here, wherein a capacitor electrode 9 arranged between two further capacitor electrodes 9 in each case forms a capacitor with these two capacitor electrodes 9 adjacent thereto.

Figure 5:
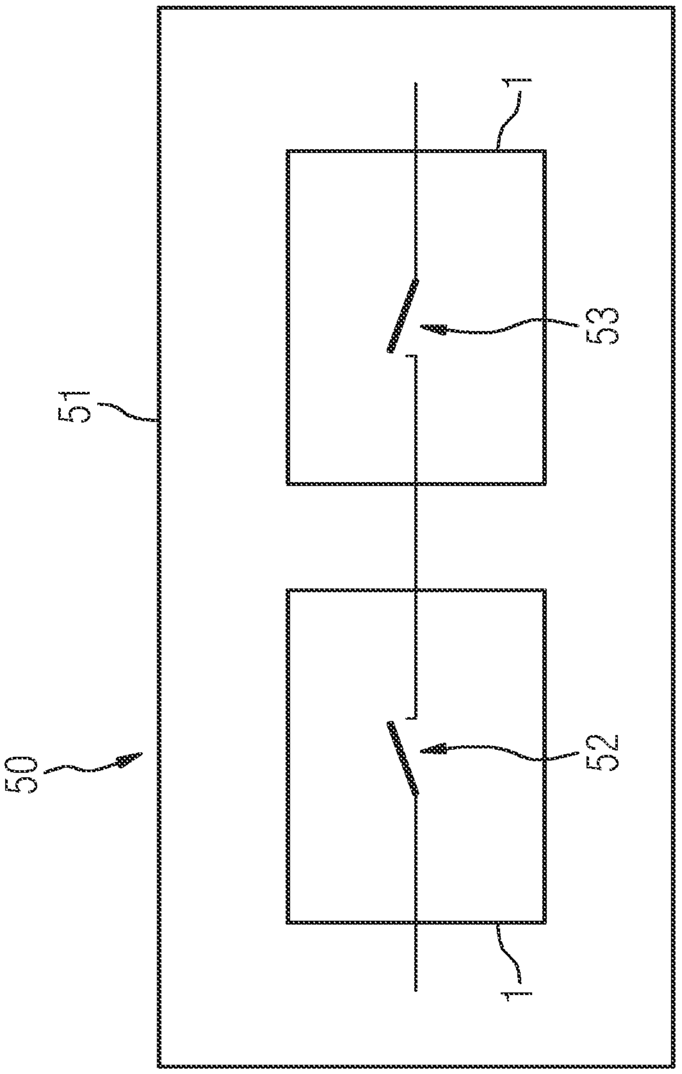
FIG. 5 shows a block diagram of a vacuum circuit breaker with two vacuum switching units.

FIG. 5 (FIG. 5) shows a block diagram of a vacuum circuit breaker 50 according to the invention. The vacuum circuit breaker 50 has a circuit-breaker housing 51 in which two vacuum switching units 1 are arranged which are each designed like one of the vacuum switching units 1 shown in FIGS. 1 to 4 and the switching paths 52, 53 of which are electrically connected in series. The circuit-breaker housing 51 is filled with purified and dehumidified compressed air, for example. The movable switching contact elements 27 of the vacuum switching units 1 are synchronously drivable, for example by means of a common circuit-breaker drive (not shown), to open and close the switching paths 52, 53.

Although the invention has been illustrated and described in detail by means of preferred exemplary embodiments, the invention is not limited by the disclosed examples, and other variations can be derived therefrom by a person skilled in the art without departing from the scope of protection of the invention.

The invention claimed is:

1. A vacuum switching unit of a vacuum circuit breaker, the vacuum switching unit comprising:

a vacuum switching tube having a longitudinal axis;

an insulating sleeve formed of an insulating material, said insulating sleeve surrounding said vacuum switching tube in a tubular form around the longitudinal axis of said vacuum switching tube;

a plurality of capacitor electrodes integrated into said insulating sleeve; and a coating disposed on at least one of a region of a surface of said vacuum switching tube that faces toward said insulating sleeve or at least one region of a surface of said insulating sleeve that faces toward said vacuum switching tube, said coating being configured to homogenize an electrical field between said insulating sleeve and said vacuum switching tube.

2. The vacuum switching unit according to claim 1, wherein said capacitor electrodes extend in an annular or partially annular arrangement around the longitudinal axis of said vacuum switching tube.

3. The vacuum switching unit according to claim 1, wherein said capacitor electrodes form electrode pairs of concentrically extending said capacitor electrodes having mutually facing electrode surfaces and said electrode pairs of concentrically extending capacitor electrodes are disposed at an axial spacing distance from one another relative to the longitudinal axis of said vacuum switching tube.

4. The vacuum switching unit according to claim 3, wherein each said electrode pair of concentrically extending capacitor electrodes is formed of a capacitor electrode that extends on a surface of said insulating sleeve facing towards said vacuum switching tube and a capacitor electrode that extends on a surface of said insulating sleeve facing away from said vacuum switching tube.

5. The vacuum switching unit according to claim 4, wherein said concentrically extending capacitor electrodes are formed of electrically conductive coating layers applied to said insulating sleeve.

6. The vacuum switching unit according to claim 3, wherein said electrode pairs of capacitor electrodes with mutually facing electrode surfaces form capacitors that are connected in series by electrical wires integrated in said insulating sleeve.

7. The vacuum switching unit according to claim 1, wherein said plurality of capacitor electrodes include capacitor electrodes that extend inside said insulating sleeve axially at a distance from one another in relation to the longitudinal axis of said insulating sleeve and that have mutually facing electrode surfaces.

8. The vacuum switching unit according to claim 1, further comprising at least one electrical resistor integrated into said insulating sleeve and connected, by electrical wires integrated in said insulating sleeve, in series or in parallel with at least one capacitor formed of two capacitor electrodes.

9. The vacuum switching unit according to claim 1, wherein said vacuum switching tube comprises at least one shield electrode that is electrically conductively connected and/or capacitively electrically coupled to a capacitor electrode.

10. The vacuum switching unit according to claim 1, wherein said insulating sleeve is made from a thermoplastic or from epoxy resin that includes a permittivity-increasing filler.

11. The vacuum switching unit according to claim 1, wherein said insulating sleeve, together with said capacitor electrodes, is a 3D-printer printed element.

12. The vacuum switching unit according to claim 1, wherein said insulating sleeve is formed of at least two sleeve parts.

13. A vacuum circuit breaker, comprising at least one vacuum switching unit according to claim 1.

14. A vacuum circuit breaker, comprising a plurality of vacuum switching units, each according to claim 1, and said vacuum switching units having switching paths that are electrically connected in series.

* * * * *